Sept. 11, 1956  J. M. WELLES  2,762,466
BRAKE BEAM
Filed May 13, 1955  3 Sheets-Sheet 1
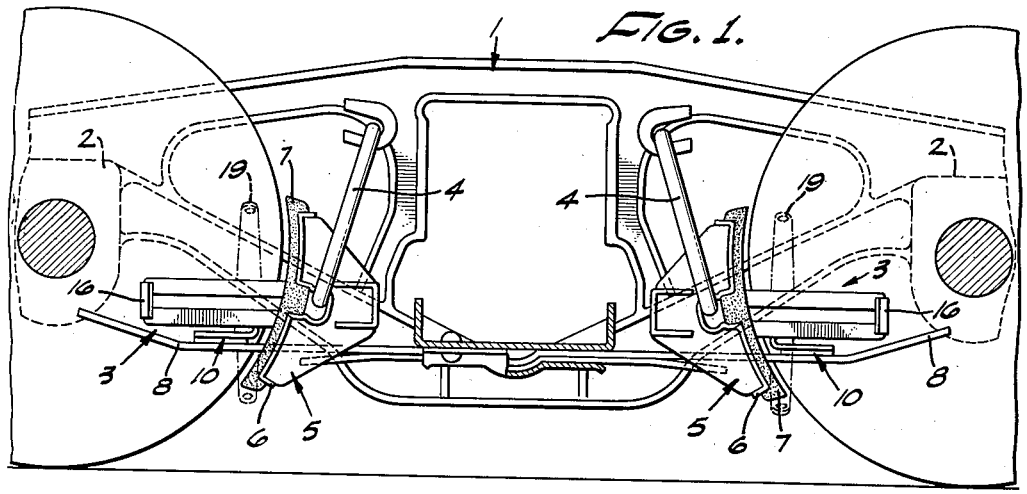
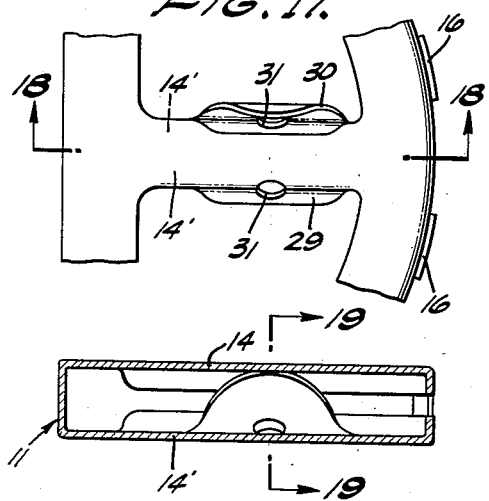
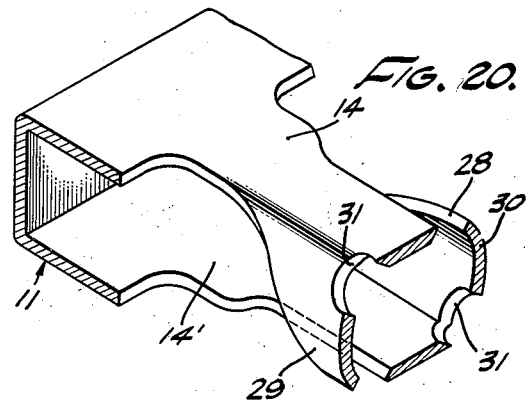
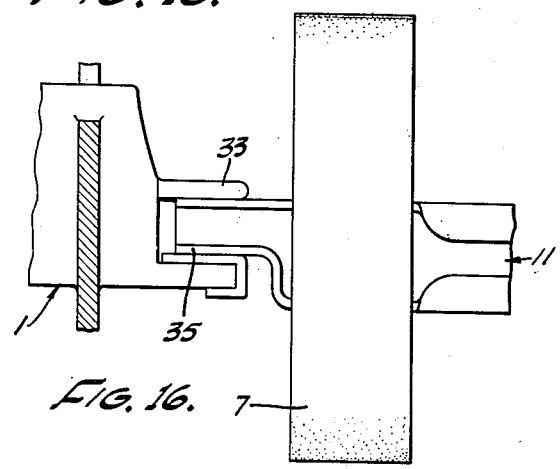
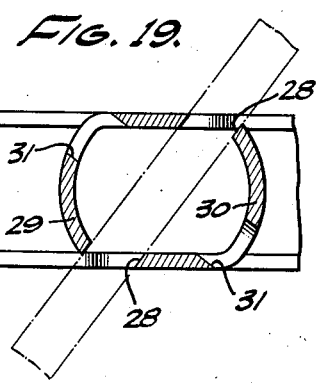
INVENTOR.
JOSEPH MARTIN WELLES
BY
Lyon & Lyon
ATTORNEYS

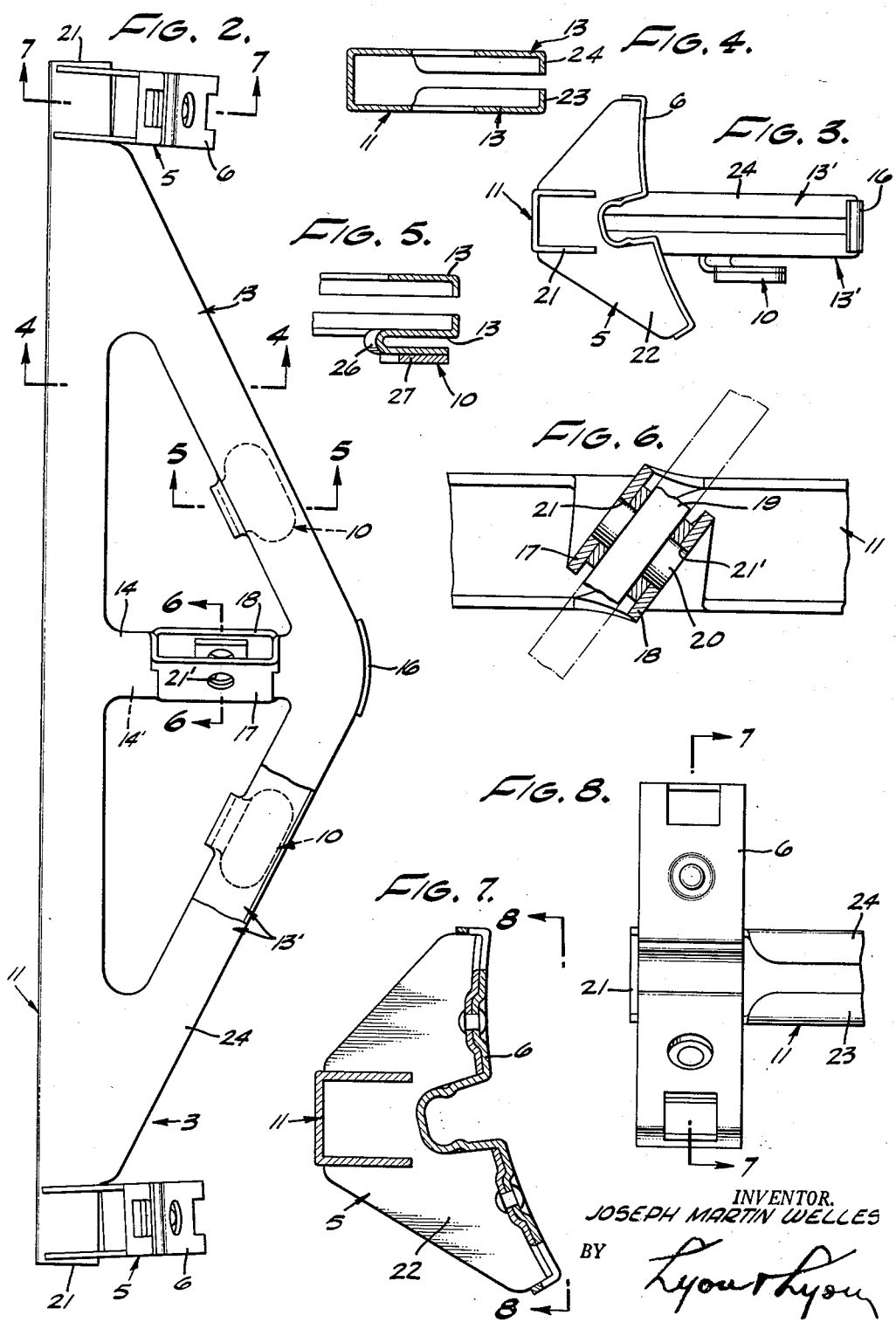

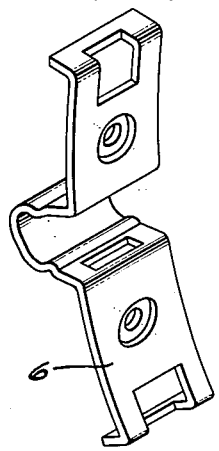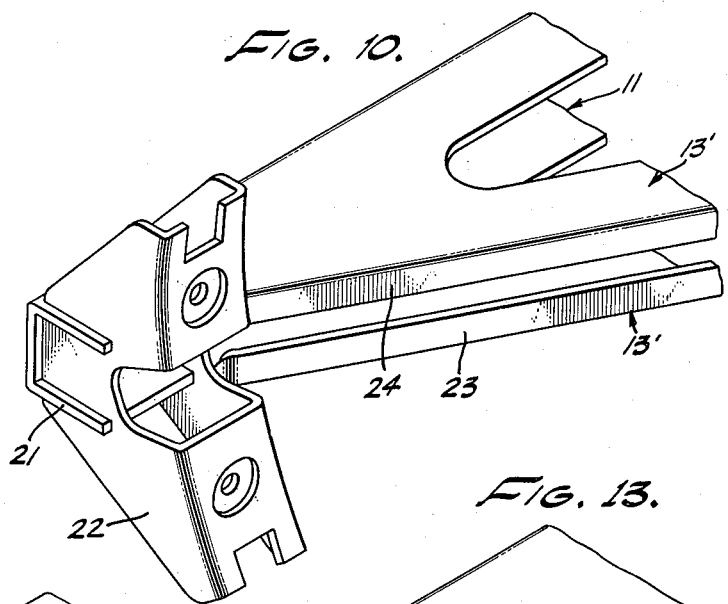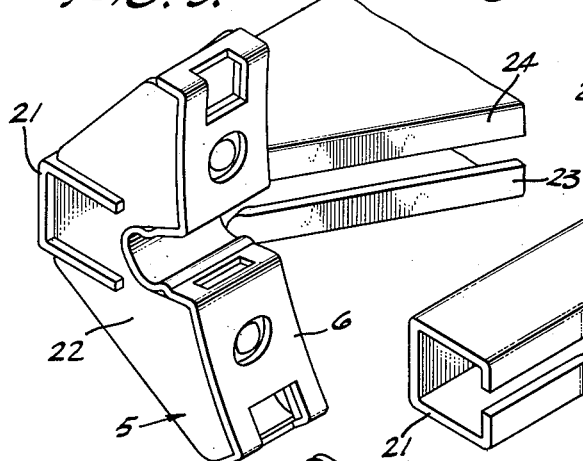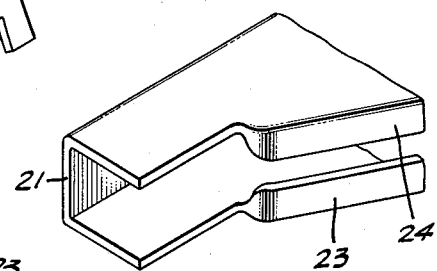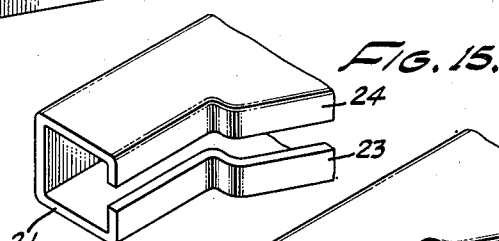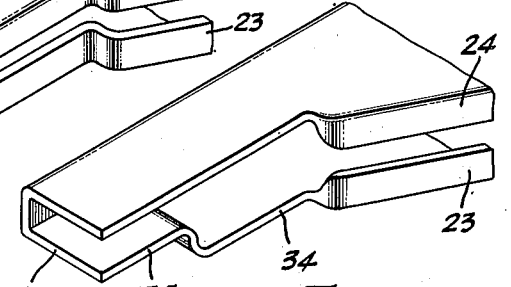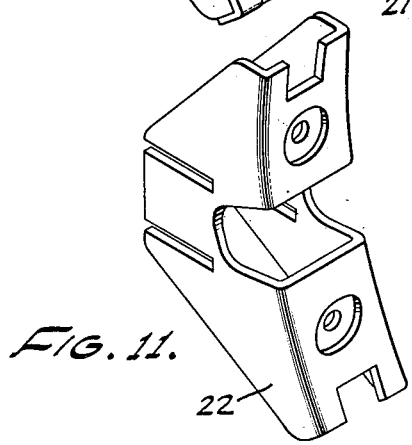

United States Patent Office 2,762,466
Patented Sept. 11, 1956

2,762,466

BRAKE BEAM

Joseph Martin Welles, Pasadena, Calif.

Application May 13, 1955, Serial No. 508,200

8 Claims. (Cl. 188—226.1)

My invention comprises a brake beam and more specifically a brake beam for use on the ordinary truck or bogie for railroad cars. A brake beam in accordance with my invention comprises a horizontal beam having compression and tension members formed integral therewith from one piece of forged metal to give the same rigidity. The means for fastening the heads and safety guards and brake rods are formed in this integral piece.

In general, my invention comprises the formation of a brake beam having a compression member, a fulcrum member, a tension member and means for attaching safety guards, heads and brake rods stamped from one sheet of steel which is then forged into a completed unitary construction.

An advantage of my invention is that there are no bolted, welded or other joints to cause weakness in the final construction of the compression, tension and fulcrum members.

Another advantage of my invention is that no castings are bolted or welded to form the beam.

Another advantage of my invention is that the means for hanging safety guards, heads and brake rods are integral members which cannot shake loose and destroy the safety advantages.

Other objects and advantages of my invention will be apparent from the following description of a preferred embodiment thereof.

In the drawings:

Figure 1 is a side elevation showing my invention in place on a railroad truck or bogie.

Figure 2 is the top beam view of my brake beam.

Figure 3 is an end elevation.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Figure 7 is a sectional view taken on line 7—7 of Figures 2 and 8.

Figure 8 is a sectional view taken on line 8—8 of Figure 7.

Figure 9 is a partial perspective of the end of my brake beam with the head and key plate fastened thereon.

Figure 10 is a partial perspective of the end of my brake beam with the head.

Figure 11 is a perspective of a head.

Figure 12 is a perspective of a key plate.

Figures 13, 14 and 15 are partial perspectives of modifications of the end by my beam showing various types of ends where the head is attached.

Figure 16 is a front view of a modification.

Figure 17 is a partial top view of a modified form of the fulcrum member.

Figure 18 is a sectional view taken on line 18—18 of Figure 17.

Figure 19 is a sectional view taken on line 19—19 of Figure 18.

Figure 20 is a partial perspective of the modification shown in Figure 17.

An ordinary railroad truck or bogie no matter how many wheels are included therein, in general comprises a cast web 1 which carries the journal boxes 2 and various springs and bolsters (not illustrated). To this truck are attached brake shoes 7 by means of a head 5 attached to a brake beam 3 and swinging on hangers 4. The head 5 carries a key plate 6 to secure thereon the brake shoe 7. The brake beams 3 are actuated by means of a brake rod 19 which attaches to the center of the brake beam 3 as will be more fully described hereinafter.

To prevent the dropping of the brake beam on the tracks in case of a breakage of the hangers 4, brake beam supports 8 are attached to the truck and upon these beam supports 8 the safety guards 10 slide thus preventing the dropping upon the tracks of the brake beam 3.

My invention does not comprise any of the previously set forth parts but is specifically directed to the construction of the brake beam 3 itself. I have heretofore described and illustrated one type of truck. To anyone familiar with the art, it will be readily apparent that my brake beam can be used with any of the trucks now used. Brake beams now in use have parallel compression members running across the trucks which are strengthened by means of triangular tension member and a fulcrum member. These have heretofore been formed of bars welded together or bar stocks or forgings or castings welded or bolted together. As can be seen, the strength of such a beam is only as strong as the joint. Due to the severe vibrations to which such structures are subject, the bolts often break or the nuts thereon back off or the welds crystallize causing a failure at the juncture.

A brake beam constructed in accordance with my invention is made of one sheet of metal as follows:

In Figure 2 is shown the final configuration of one form of my invention. This is made of a sheet of metal and then the same is bent by forging or like process to make a channel shaped compression member 11 (Figure 10). At the same time, the two parallel sides of the sheet form the tension members 13 and 13′ and fulcrum members 14 and 14′. A closure plate 16 can be welded at the point where the fulcrum members and tension members meet to space the two sides of the tension members 13 and 13′ apart. Of course, such a closure plate 16 is not always necessary but is added merely to maintain the spacing. As will be seen, this forms a unit construction having a compression member 11 for the brake beam 3 and the tension and fulcrum members 13 and 13′, 14 and 14′ formed from a single sheet of metal forged to form a channel shaped compression member and parallel double fulcrum and tension members.

To give the above referred structure further rigidity, during the forging and bending from the flat sheet any desired flanges such as those shown at 23 and 24 may be formed on the tension members 13 and 13′.

Referring specifically to Figure 6, the fulcrum members are forged or bent to form the parallel tabs 17 and 18 between which is placed the brake rod 19 which is held in position by a pin 20 through the bores 21 and 21′.

At the ends, my brake beam is formed to make a U shaped end 21 to which is attached a head 22. In Figures 13, 14 and 15 are shown various manners of forming the flanges to form the end of the brake beam to which the head is attached. These comprise the U-shaped channel 21 in which the flanges 23 and 24 cease at the start of the projection for the U-shaped member 21. In Figure 15 these flanges are continued to the end of channel 21. Another form has various bends made in the end as shown in Figure 14 to further strengthen the end of the brake beam. It should be specially noted that all of these modifications incorporate the principle of a single unitary sheet of material forged and bent to form the finished brake beam.

One of the advantages of my invention is that the safety guard is not merely bolted or welded to the tension members 13 and 13' as in previous construction but is made as an integral part. This is done by having the lower plates of the tension members 13 and 13' punched out as shown in Figure 5 so as to make a U-shaped strap 26 which can ride upon the brake beam support 8. Of course, a wear shoe or rub plate 27 can be welded thereon to prevent wear.

In Figures 17 to 20 inclusive, I show another form of construction for the fulcrum members 14 and 14' and means of attaching the brake rod. In this type of construction, the one side of the fulcrum member 14 has a tab 29 forged thereon which is bent down and the other member 14' has a tab 30 which is bent upwardly to form a parallel slot 28 through which the brake rod can be passed. The tabs 29 and 30 have the bores 31 for a key or bolt hole.

In some of the more modern trucks or bogies the hanger 4 for the brake beam has been disposed of and in its place, a guide 33 has been positioned on the inside of the cast web 1 in which an extension of the brake beam slides. To provide for this type of truck, I prefer to use the structure shown in Figure 14 wherein the head is attached to the section 34 which is the normal U-shaped end 21 and to make a U-shaped extension 35, extending therefrom which rides in the guides 33. Of course, to prevent wear between the guides 33 and the extension 35 any type of wear shoe may be incorporated. Thus, it will be seen that my invention can be used with either the hanger type of truck or with the guide type.

I claim:

1. A brake beam formed from a single sheet of material bent to form a channel shaped compression member, with integrally formed opposed fulcrum members and tension members projecting from the flanges of the compression member and fulcrum members.

2. A brake beam formed from a single sheet of material bent to form a channel shaped compression member, with integrally formed opposed fulcrum members and tension members projecting from the flanges of the compression member and fulcrum members, and integral strengthening flanges on said tension members.

3. A brake beam formed from a single sheet of material bent to form a channel shaped compression member, with integrally formed opposed fulcrum members and tension members projecting from the flanges of the compression member and fulcrum members, and integral tabs formed on said fulcrum members for attaching a brake rod.

4. A brake beam formed from a single sheet of material bent to form a channel shaped compression member, with integrally formed opposed fulcrum members and tension members projecting from the flanges of the compression member and fulcrum members, integral strengthening flanges on said tension members, and integral tabs formed on said fulcrum members for attaching a brake rod.

5. A brake beam formed from a single sheet of material bent to form a channel shaped compression member, with integrally formed opposed fulcrum members and tension members projecting from the flanges of the compression member and fulcrum members, said tension members having U-shaped straps formed integrally therein to ride on a safety guard.

6. A brake beam formed from a single sheet of material bent to form a channel shaped compression member, with integrally formed opposed fulcrum members and tension members projecting from the flanges of the compression member and fulcrum members, integral strengthening flanges on said tension members, said tension members having U-shaped straps formed integrally therein to ride on a safety guard.

7. A brake beam formed from a single sheet of material bent to form a channel shaped compression member, with integrally formed opposed fulcrum members and tension members projecting from the flanges of the compression member and fulcrum members, integral strengthening flanges on said tension members, integral tabs formed on said fulcrum members for attaching a brake rod, said tension members having U-shaped straps formed integrally therein to ride on a safety guard.

8. A brake beam formed from a single sheet of material bent to form a channel shaped compression member, with integrally formed opposed fulcrum members and tension members projecting from the flanges of the compression member and fulcrum members, and an integral channel shaped extension at the ends of said compression member to act as a head support.

References Cited in the file of this patent
UNITED STATES PATENTS

| | | |
|---|---|---|
| 567,664 | Sullivan et al. | Sept. 15, 1896 |
| 803,313 | Streib | Oct. 31, 1905 |
| 2,499,899 | Baselt | Mar. 7, 1950 |